United States Patent [19]

Savic evi

[11] Patent Number: 5,275,111
[45] Date of Patent: Jan. 4, 1994

[54] TRANSPORT SYSTEM WITH A MINIMUM OF TWO SUPPORTING POINTS DISPOSED ON OPPOSITE SIDES OF INTER-CONNECTED RING FRAMES

[76] Inventor: Milorad Savic evi, Maglajska 5, Belgrade 11000, Yugoslavia

[21] Appl. No.: 672,958

[22] Filed: Mar. 21, 1991

[30] Foreign Application Priority Data

Jul. 23, 1990 [YU] Yugoslavia ............................ 1434/90

[51] Int. Cl.$^5$ .............................................. B61B 13/00
[52] U.S. Cl. .................................. 104/138.1; 104/121; 104/124
[58] Field of Search ............... 104/89, 138.1, 138.2, 104/130.1, 124, 125, 282, 307, 121; 105/365, 147

[56] References Cited

U.S. PATENT DOCUMENTS

| | | | |
|---|---|---|---|
| 373,605 | 11/1887 | Read | 104/121 |
| 424,168 | 3/1890 | Boynton | 104/121 |
| 549,936 | 11/1895 | Rush | 104/138.1 |
| 2,023,906 | 12/1935 | Strauss | 104/124 |
| 3,006,288 | 10/1961 | Brown | 104/124 X |
| 3,236,192 | 2/1966 | Esquillan | 104/124 |
| 4,503,778 | 3/1985 | Wilson | 104/89 X |
| 4,512,258 | 4/1985 | Matsukata | 104/138.1 |

FOREIGN PATENT DOCUMENTS

| | | |
|---|---|---|
| 3640779 | 10/1927 | Fed. Rep. of Germany . |
| 2159340 | 6/1973 | Fed. Rep. of Germany ... 104/138.1 |
| 2216484 | 10/1973 | Fed. Rep. of Germany . |
| 2331445 | 1/1975 | Fed. Rep. of Germany . |
| 2434125 | 9/1975 | Fed. Rep. of Germany . |
| 3503504 | 8/1986 | Fed. Rep. of Germany . |
| 3612847 | 10/1987 | Fed. Rep. of Germany . |
| 3612848 | 10/1987 | Fed. Rep. of Germany . |
| 847 | of 1870 | United Kingdom ................ 104/124 |

Primary Examiner—Robert J. Oberleitner
Assistant Examiner—Kevin D. Rutherford
Attorney, Agent, or Firm—Anderson Kill Olick & Oshinsky

[57] ABSTRACT

The invention refers to a transport system with a minimum of two supporting points disposed on opposite sides of inter-connected ring frames, where within the annular tube (21) along tracks travel light rail vehicles with a passenger cabin. The structure of the cabin is similar to that of an airplane fuselage, where the cabins are at the same time supported by the lower and upper rotating bases which are disposed in the shape of rails (2,3) which include the side rails (10) also bonded to the opposite sides of the basic rings (1). The basic rings (1) are inter-connected by side supports (18) bonded by side bonds (19) for longitudinal central supports (12,13) and longitudinal side supports (14,15) disposed on horizontal frame beams (11) of double columns (10) as vertical supports (4b) of the support structure system.

1 Claim, 7 Drawing Sheets

TRANSPORT SYSTEM WITH A MINIMUM OF TWO SUPPORTING POINTS DISPOSED ON OPPOSITE SIDES OF INTER-CONNECTED RING FRAMES

BACKGROUND OF THE INVENTION

The present invention relates to a transport system having at least two supporting points disposed on opposite sides of inter-connected ring frames.

The technical problem which is solved by this invention is how to reduce drive energy as well as to rationalize the available space, together with the increase in safety and stability of transport vehicles at greater speeds, to create a transport system with light passenger rail carriages of the specified type. These vehicles will at the same time be supported by at least one lower rail and hanged on at least one upper rail, which will be the adequate support of the multi-rail railway with tracks disposed in annular rib shaped i.e. grille tubes with interconnected longitudinal base annular systems disposed on the above ground, ground level and underground supporting structure.

Today exist various transport systems with rail carriages moving on tracks resting on rails which act as lower supports, or else carriages are hanged on a carrying rail with at least one elevated support, as is the case with the single rail.

The German patent DE 36 12 847 A1, offers a solution for the transport system with lower supports of a magnetic rail of an electromagnetic or electrodynamic system with passenger carriages on tracks disposed in tunnel tubes which are equiped with carrying magnets. The transport system also includes beams with leading magnets connected with controllers on which are disposed directly or by means of platforms passenger carriages which move in tunnel tubes.

A similar transport system with lower supports on a magnetc rail as decribed in the German patent DE 36 12 848 A1, in which air resistance formed in front of the passenger carriage in motion at relatively high speed is carried out through special canals and it can also be sent to the adjacent tunnel tube where cabins move in the opposite direction.

Another solution relative to this problem is shown in the German patent DE 36 40 779 A1. This solution consists of a system of closed tubes with a railway, placed above or underground, in which a vacuum is maintained, in order to reduce air resistance. Because of this, these vehicles must be built resistant to suction pressure i.e. underpressure of the surrounding air and sealed the same way as the tube in which the rail is disposed. Vehicles would have to enter and leave these tubes through special chambers i.e. sealed slide gates accompanied by special security measures.

Another German patent DE 35 03 504 A1 provides another solution of the transport system with hanged passenger carriages. With this system, a rail is set high above ground level, across horizontal special shaped steel or armoured concrete beams, over which rolling bases with leading and drive wheels move, on which passenger carriages are set by the roof in the hanging position.

The basic deficiencies of all these known solutions from the point of view of engineering, lie in the fact that transporting vehicles i.e. passenger rail carriages are propped only by lower supports or only by the upper supports of the suspended rail. Also, since these transport systems move at a relatively high translatory speed, at which they enter curves, which cannot be avoided, these vehicles require an adequately strong bearing structure being relatively heavy, which would be capable of handling and transporting all relatively big e.g. centrifugal and inertial forces. This situation is made even more difficult if the vehicle structure should be placed under relatively strong forces which appear as a result of differences in air pressure within and out of the transport vehicle. On the other hand the great weight of these vehicles require adequate dimensions of rail elements such as: supports, columns, tube elements and others, while at the same time for moving these vehicles, a relatively great amount of drive energy is used for overcoming all resistance of friction and movement, as well as the inertial force.

SUMMARY OF THE INVENTION

The aim of the present invention is to present a completely new transport system with passenger rail vehicles, of the light weight, which vehicles will at the same time be supported by at least one lower rail and hanged on at least one overhead rail as adequate supports disposed on opposite sides of the multi-rail with tracks disposed in an annular, rib or grille shaped tube with a longitudinal inter-connected basic rings placed on the above ground, ground level and underground structure.

This invention first of all has introduced the light weight transport vehicles i.e. the adequate passenger rail carriage, which consists of a cabin having the same structure as an airplane, for example such as the type "Boing 737" or "Boing 727" with six seats in a row together with the necessary additions. These cabins are placed, for example on the chassis of the known rotating base of the rail vehicle, or on the carriers with leading magnets, which roll or glide across rail(s) track(s) of single or multi-rail railways.

At the same time, these cabins are, beside the described support on the lower beams, also hanged on the rolling base of the known structure, whose upper rail(s) being bonded to the basic rings longitudinally connected to the supports of the carrying structure.

In order to increase the stability of the transporting vehicle this invention also requires placing wheels or slides on the lateral sides of cabins for side support, which are bonded on opposite sides on the basic rings of the transport system.

This type of simultaneously supported and hanged passenger rail cabins, on at least two supporting points, on opposite sides, allows us to use rail vehicles which are even five times lighter in weight when compared to the ones used today, of the same capacity. For the same reasons it is to be expected that considerable energy will be saved for the same capacity of the transport system.

On the other hand, as mentioned the transport vehicle according to this invention, travel along single and or a multi-rail tracks, with tracks placed on opposite sides bonded at the base rings of the annular tube system. These basic rings are connected by transverse and longitudinal bonds i.e. supports which are horizontally interconecting basic rings. In addition, these transverse and longitudinal supports are known bond elements, which form longitudinally an annular rib or grille shaped tube, through which the passenger rail vehicle moves on tracks.

At the same time, these annular tubes are placed on their vertical supports which form the carrying structure system. According to this invention, these vertical supports are built according to construction variations as well known above ground, ground level and underground columns or portals.

This way of leading a travelling vehicle, along the carrying and leading rail tracks disposed in the described tube, bonded on the described supporting structure, allows them to reach high speeds which are mentioned, and secure their complete stability at these speeds and the whole transport system allows us to use the considerably reduced space, both on and underground, as rationally as possible.

BRIEF DESCRIPTION OF THE DRAWINGS

In order to give us a more detailed explanation of the invention, it will be described with precision and variations, as shown on the drawings.

DETAILED DESCRIPTION OF THE PREFERRED EMBODIMENTS

Figure 1:
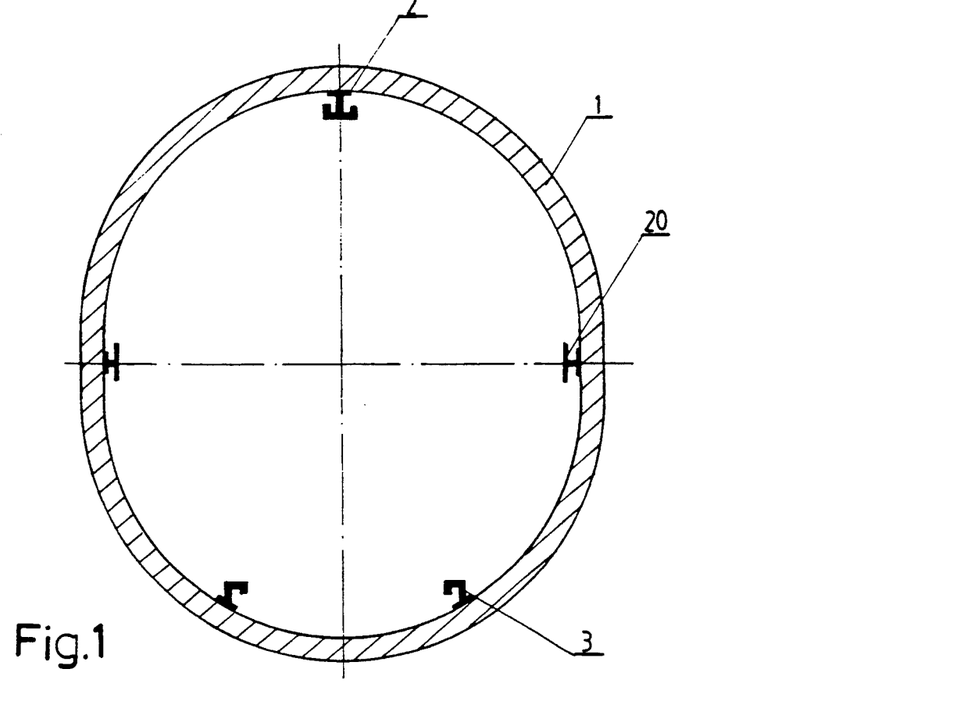
FIGS. 1, 2 and 3 illustrate the basic ring i.e. the frame of the transport system with tracks bonded in different positions.
Figure 2:
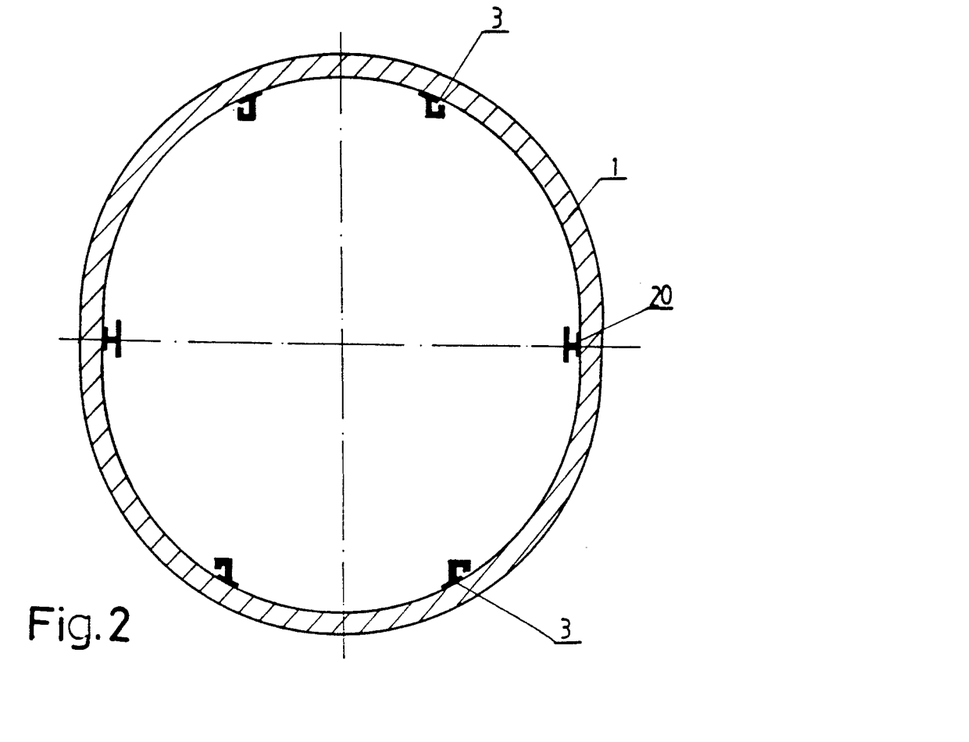
Figure 3:
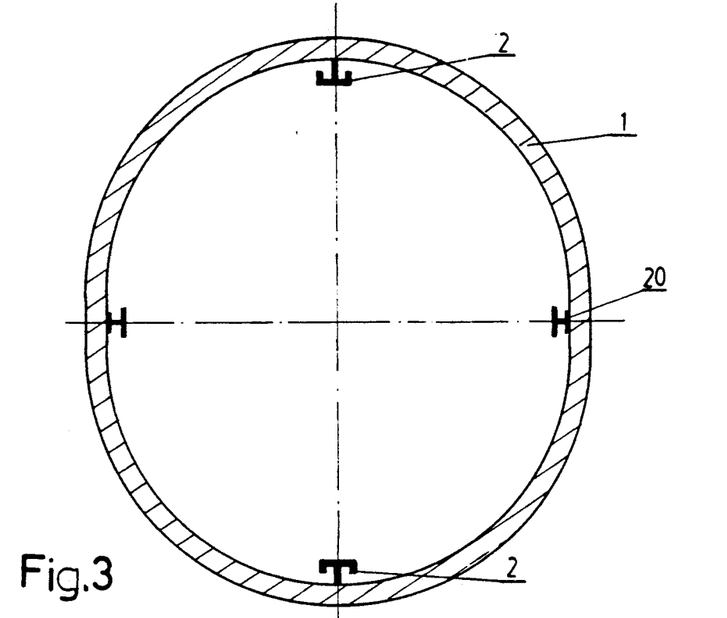
Figure 4:
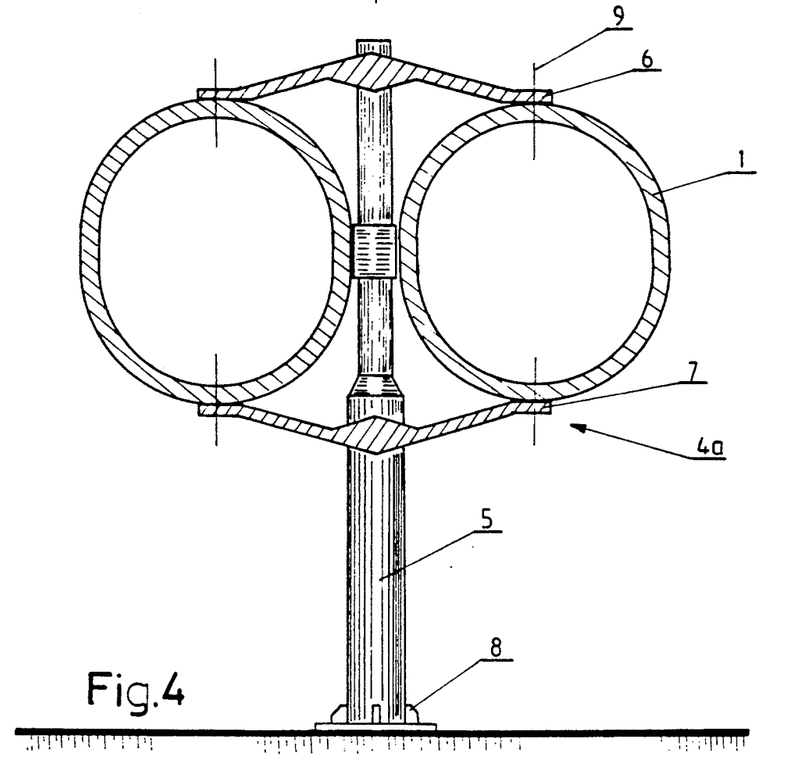
FIG. 4 illustrates the vertical support of the basic rings tube, in the shape of a single column.
Figure 5:
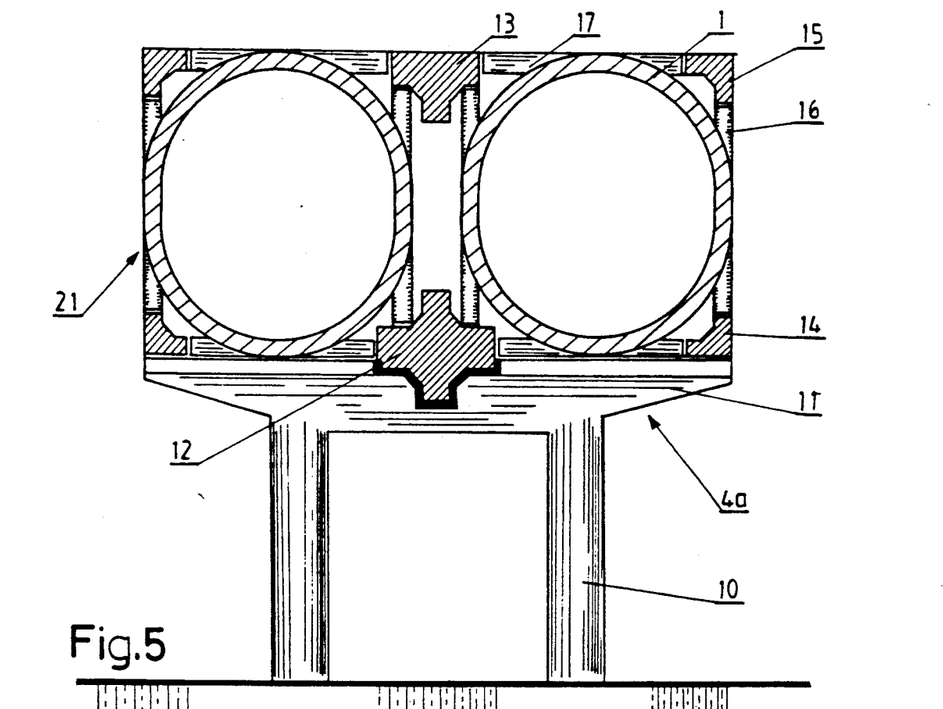
FIG. 5 illustrates the partial cross-view of the vertical support of the basic rings of the annual tube, in the shape of a double column.
Figure 11:
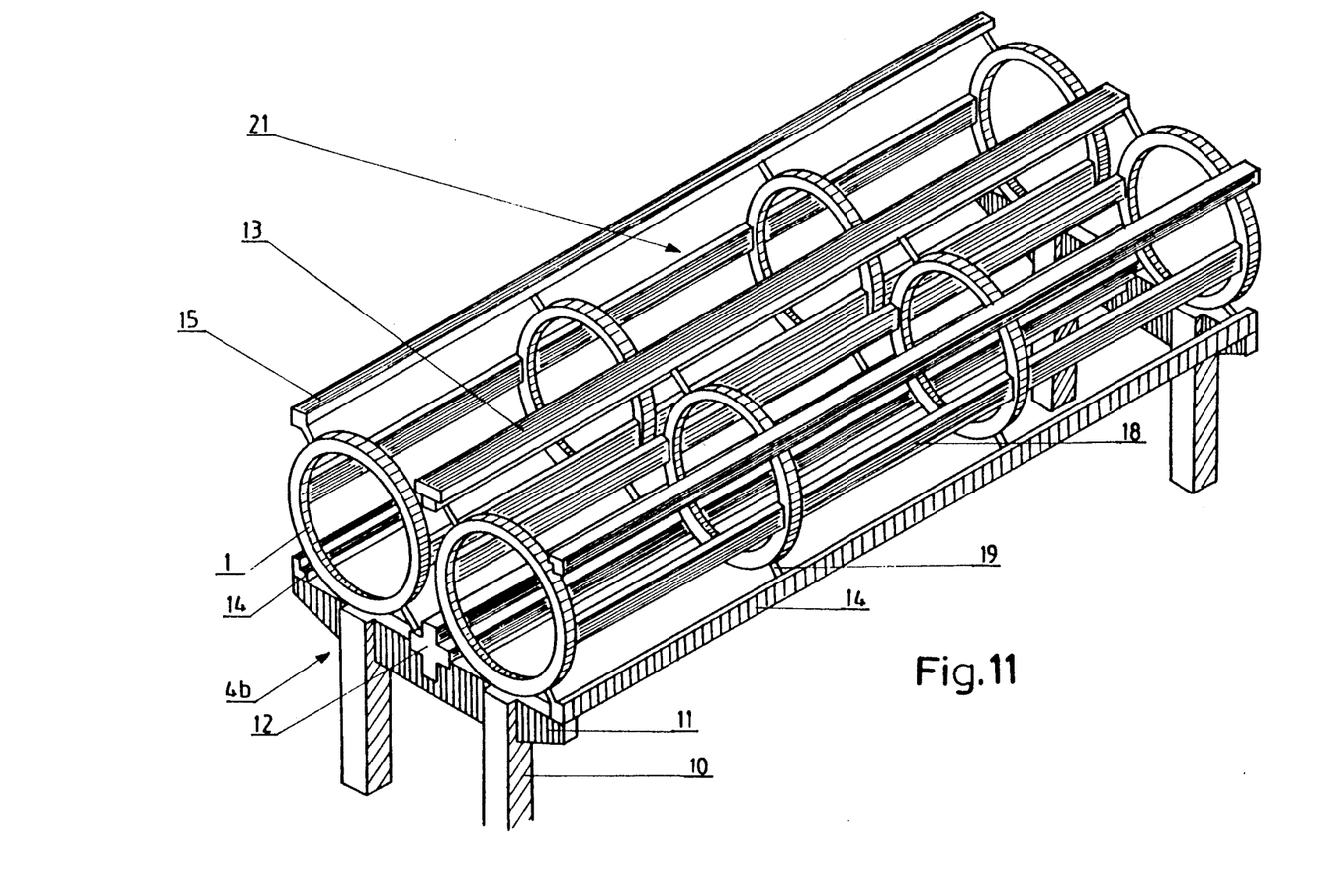
FIG. 11 illustrates from the perspective appearence of the assembled vertical, transverse and longitudinal supports of the annular grille tube as well as the actual tube.

From FIGS. 1 to 9 as on FIG. 11 illustrates the basic frame i.e. basic ring 1, 1a being the first element of the annular tube 21 of the system according to the invention. This basic ring 1, 1a, as shown, is of the most favourable elliptical shape with the size ratio of the semi axis 1:1, 2 and with the cross-view of the ring square shaped from adequate material as prestressed concrete or profile steel supports etc. on the lower and upper side of the basic ring 1, 1a with the well known means of bonding tracks to the sleepers (not shown on the illustrations) bonded are the upper and/or lower tracks 2, 3. These upper and lower tracks 2, 3 are of the well known shape and dimension and can be multipart tracks 2 as well as single tracks 3, together with other tracks of different shape. At the same time, according to FIGS. 1-3 tracks 2, 3 can be arranged differently. The most suitable arrangement with one multipart track 2, bonded to the upper side of the basic ring 1, 1a and with two single tracks 3 bonded spaced out on the lower side of the basic ring 1, 1a is shown in FIG. 1. FIG. 2 illustrates the solution with two single tracks 3 reciprocally disposed on the upper and lower side of the basic ring 1, 1a, while FIG. 3 illustrates the solution with one multipart track 2 bonded to the upper and lower side of the basic ring 1.

On the lateral sides of the basic rings 1, 1a and FIGS. 1-3, there are bonded tracks 20 by use of known means. These side tracks 20 are also of the well known shape and dimension i.e. the so called leader track, and their disposition is the most convenient because they are placed nearly half way up the basic rings 1, 1a on the opposite lateral sides.

For support of the basic rings 1, 1a according to FIGS. 4-11 are foreseen vertical supports 4a, 4b, 4c, 4d, 4e and 4f, which are the main elements of the support structure system.

According to this invention, these vertical supports 4a (FIG. 4) are made as the well known reinforced concrete columns or vertical single columns 5 made from the welded steel profiles with upper supports 6 and lower supports 7. These vertical columns 5 are bonded with anchor plates 8 to its foundation. The traverse supports 6 and 7 are with the necessary bonding in the known way (not shown on the figures) disposed in the vertical axis lines 9 bonded to the basic rings 1, where the railway, tracks and rails 2, 3 are disposed.

Vertical supports 4b (FIGS. 5 and 10) are made of the same shape as the known reinforced concrete columns or double columns 10 made from welded steel profiles. These columns 10 are connected in the upper part by a horizontal frame beam 11, on which the central lower main longitudinal support 12 is disposed as well as the lower side longitudinal support 14. These main longitudinal supports 12 and the side longitudinal supports 14 together with the double columns 10 shape the supporting grille structure of the annular tube 21 connected by vertical bars 16 and horizontal bars 17 interconnected with the upper central main longitudinal support 13 and the side longitudinal supports 15 in the usual manner, on which in the usual manner the basic rings 1, are bonded, forming the annular tube 21, where the railway, tracks and rail 2, 3 are disposed.

FIG. 11 illustrates the vertical supports 4b of the basic rings 1 also made as double columns 10 with transverse frame beams 11, on which the central main longitudinal lower support 12 and the lower side 14 are disposed. However, instead of the vertical and horizontal bars 16, 17 additional side supports 18 have been disposed as well as connections 19 for connecting the basic rings 1 with the central upper main longitudinal support 13 as well as with the upper side longitudinal support 15. In this way the annular tubes 21 are shaped, having the railway, tracks and rail 2, 3.

Figure 6:
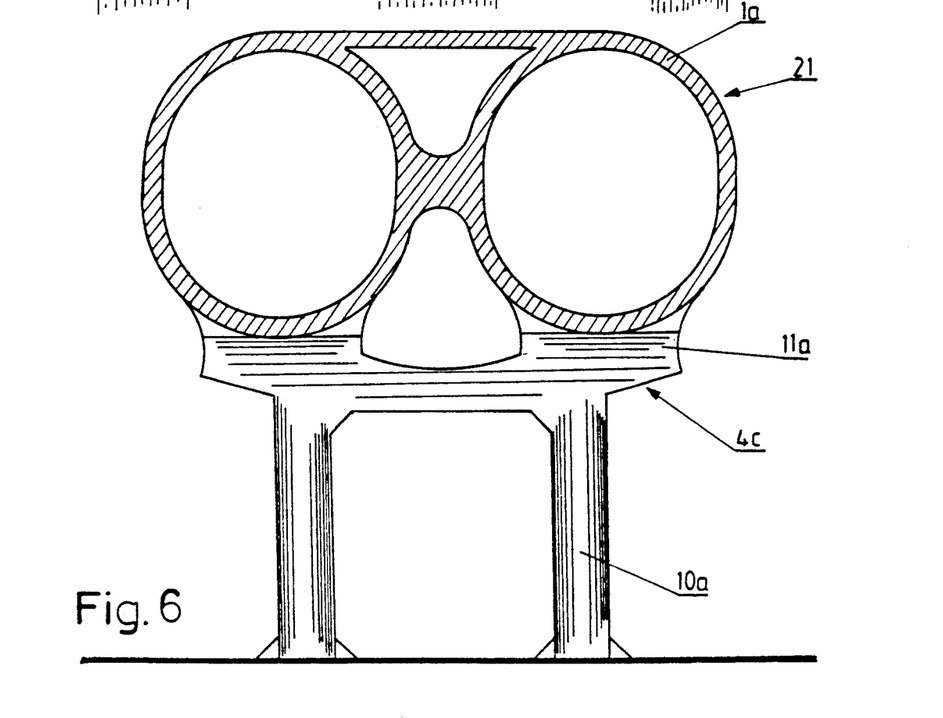
FIG. 6 illustrates a somewhat changed cross-view of the vertical support of the basic rings annular tube in the first variety of implementation, from monolithic reinforced concrete.

FIG. 6 illustrates the first structural variation to the construction of the vertical support 4c in the shape of the double column 10 made from monolithic reinforced concrete, on whose frame beams 11a are disposded monolithic interconnected basic rings 1a (of the reinforced concrete structure), which form annular rib shaped tubes 21 with the railway, tracks and rails 2, 3 disposed in it.

Figure 7:
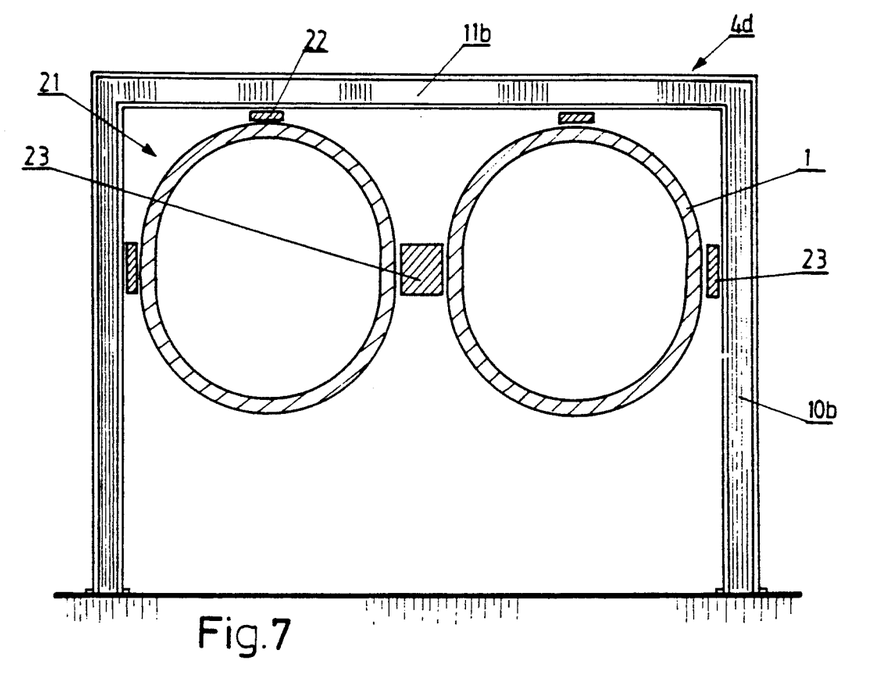
FIG. 7 illustrates the vertical support of the basic rings annular tube in the shape of the portal in the second variety of implementation.

FIG. 7 illustrates the second variety of implementation of the vertical support 4d in the shape of the portal column 10b on whose frame beams 11b are hung with the known hanging elements 22 the described basic rings 1 forming the rib shaped annular tubes 21 with the disposed railway, tracks and rails 2, 3. For reciprocal side supporting of the basic rings annular tubes 21, as well as for support on the portal columns 10b, the known bond and support elements 23 are disposed.

Figure 8:
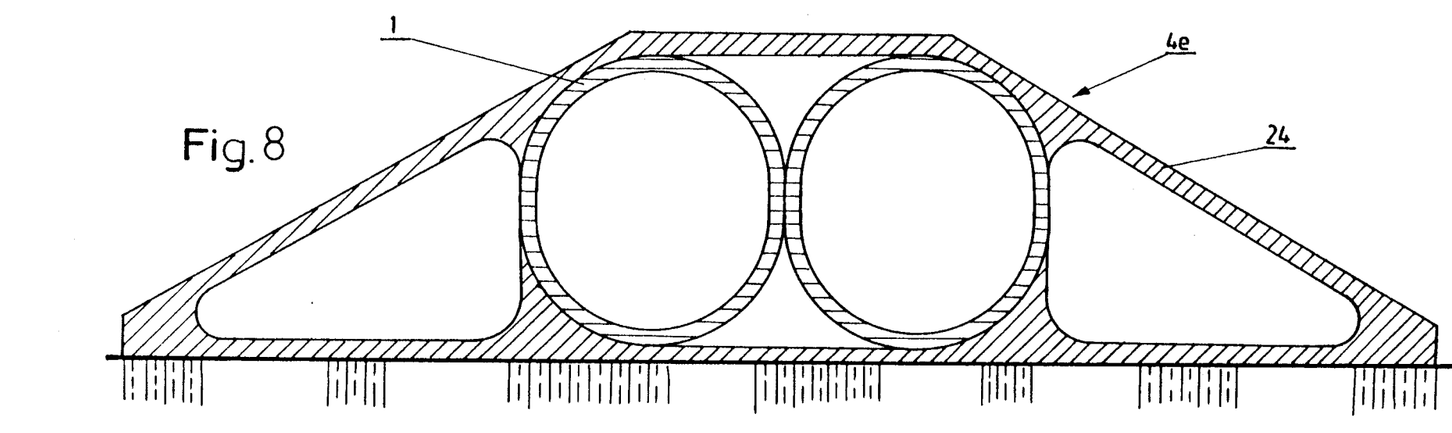
FIG. 8 illustrates a cross-view of the vertical support of the basic rings annular tube with a ground level support structure in the third variety of implementation.

FIG. 8 illustrates the third variety of implementation of the suppport 4e in the shape of a ground level monolithic support 24 made as a reinforced concrete structure.

In this support 24, basic rings 1 are bonded in the known way directly one next to the other, forming two annular tubes 21 having the railway, tracks and rails 2, 3.

Figure 1A:
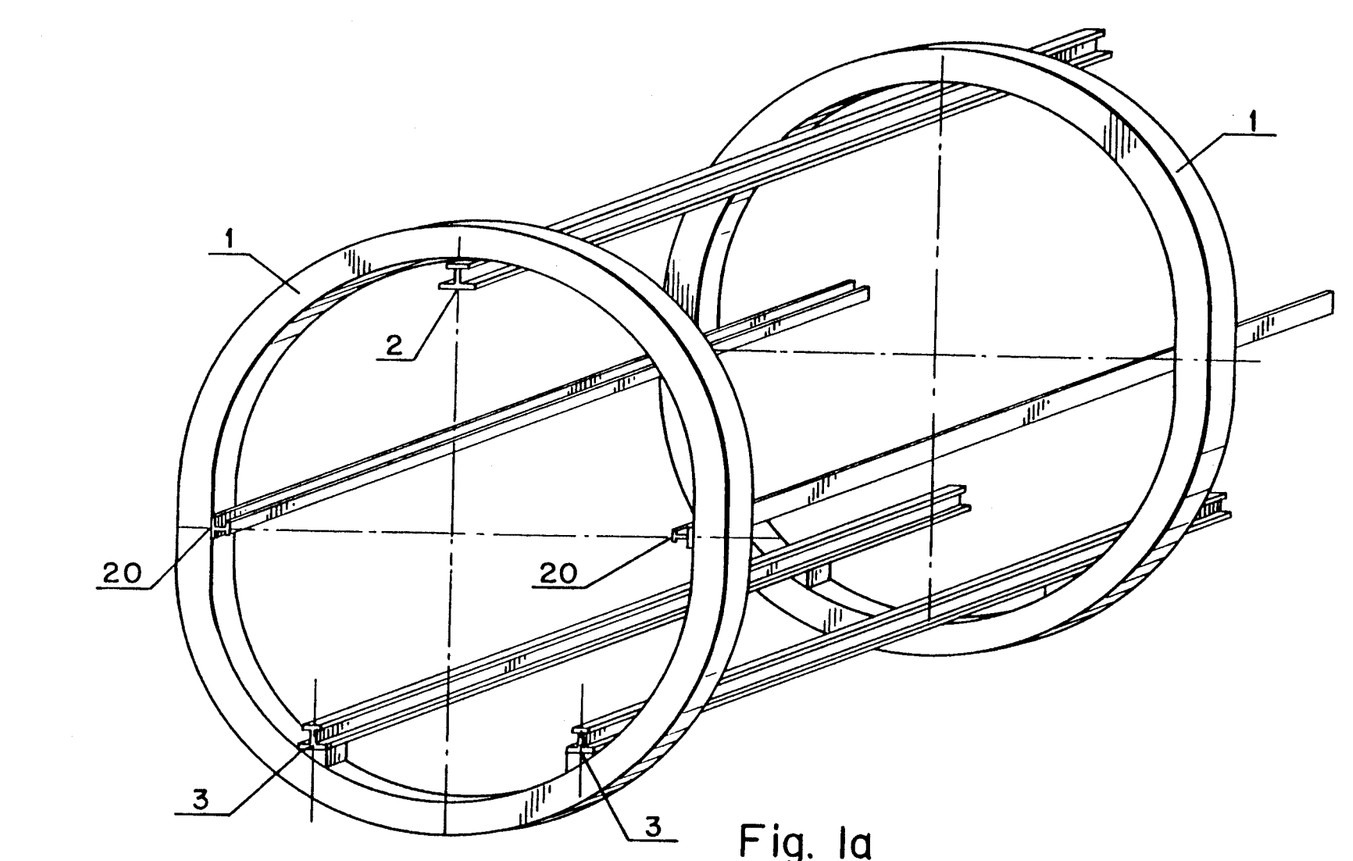
Figure 9:
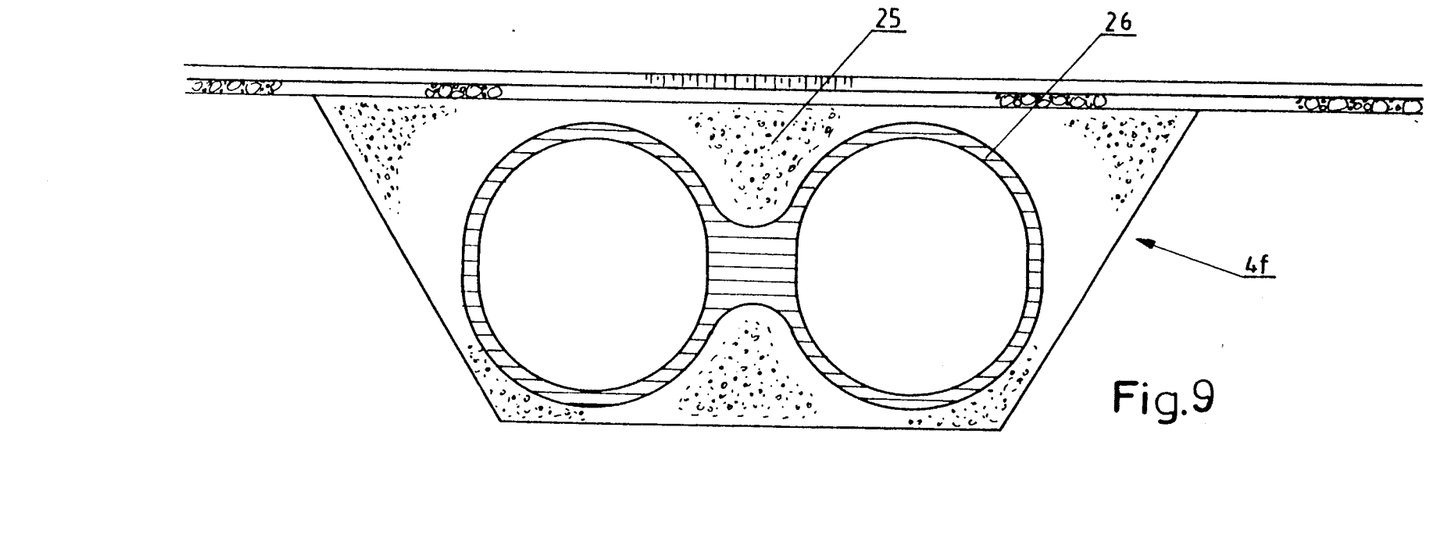
FIG. 9 illustrates a cross-view of the vertical support of the basic rings annular tube with an underground support structure in the fourth variety of implementation.
Figure 10:
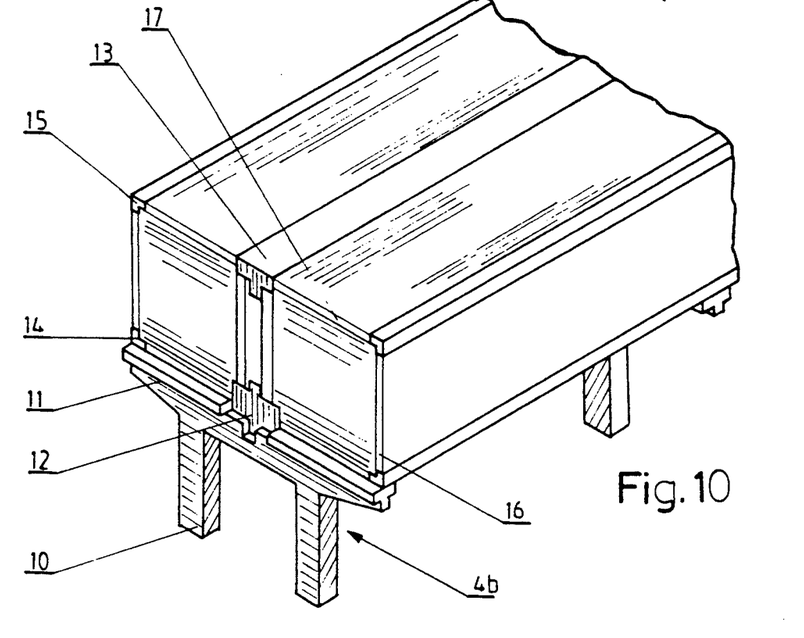
FIG. 10 illustrates the perspective appearance of the assembled vertical, transverse and longitudinal supports of the annular grille tube from FIG. 5.

FIG. 9 illustrates the fourth structural variety of implementation of support 4f in the shape of an underground profile 25, canal i.e., tunnel reinforced concrete or solid steel tubes 26 of the adequate profile, which have the same function as annular tube 21. These tubes 26 in profile 25 are dug into the ground under its level as is shown on FIG. 9. FIG. 1a shows a tube 26 with a section removed to illustrate the inside of the tube.

According to the possible implementation of this invention the supports 4b (FIGS. 5, 10 and 11) are made as the structure described in the German patent DT 23 31 445 C3, where these vertical supports 4b are disposed with the possibility of adjusting in the travers direction of the position of the side longitudinal supports 12, 13, 14 and 15 which support the structure of annular tube 21, being bonded in that position with anchor bolts. These vertical supports 4b are made with frame beams 11 as side support elements together with the mentioned anchor bolt screws, whose upper surface according to one manner of realization is at 800 cm. minimum height above ground level, having at the same time the inner dimension of the ellipse axis basic rings 1 of 420×470 cm. with the thickness of the reinforced concrete wall of the basic ring 1 of 30×30 cm.

According to another way of implemention of this invention, annular tubes 21 with the pertaining basic rings 1, with longitudinal supports 12, 13, 14, 15 and 18 together with the grille bars 16, 17 and the transverse bonding 19, are disposed in accordance with the procedure and structure described in the German patent DT 22 16 484 C3, in seperate sections.

According to this, these separate divided sections are placed on vertical supports 4b and after the necessary adjusting of the reciprocal position they are set fixed and are connected in the previously described way.

It goes without saying that the previously described ways of realization of the invention, do not restrict in any way, which at the same time includes all other future variations. That is to say, this applies also to the structural solution with pipes disposed in the grille structure of hollow metal tubes, interconnetced by self-adjusting hinge joints with balls in the mutual bearing box. At the same time, this grille structure is hung from special supports at the particular vertical support shaped as single columns 5.

I claim:

1. A transport system for a light weight passenger vehicle having a cabin structure supported by one of rotating bases with drive axles and wheels, and gliders with leading magnets of a magnetic railway, comprising a minimum of two supporting points disposed on opposite sides of interconnected ring frames through which the light weight passenger vehicle can pass, the ring frames including a plurality of basic rings (1, 1a), on which at least two tracks (2, 3), including lower tracks and upper tracks, are bonded so as to support the passenger rail vehicle, the at least two tracks (2, 3) being disposed vertically on opposite sides of the basic rings (1, 1a) so as to simultaneously support the rail vehicle on the lower tracks and hang the rail vehicle from the upper tracks, the plurality of basic rings (1a, 1a) are connected together into a cylindrical cage tube-shaped member (21) by longitudinal beams (12, 13, 14, 15, 18) and transverse bonds (19), tracks of a multi-rail railway being disposed in the tube-shaped member (21), said tracks also including side tracks (20) bonded on opposite lateral sides of the basic rings, and further comprising means (4a, 4b, 4c, 4d, 4e, 4f) for supporting the tube-shaped member (21), wherein the supporting means includes vertical support members (4b) shaped as double columns connected on an upper side by a horizontal beam (11), with supported lower central longitudinal beams (12) and lower side longitudinal beams (14) interconnected by horizontal bars (17), as well as vertical bars (16) with which upper central longitudinal beams (13) and upper side longitudinal beams (15) are connected, the beams and bars being bonded to the basic rings (1) so as to form a grill support structure of the tube-shaped member (21) that is connected to the upper side of the vertical support members, wherein the basic rings (1) are connected to the horizontal frame beams (11) of the double columns (10) by the lower central longitudinal beams (12) and lower longitudinal side beams (14) to which the basic rings are bonded by the transverse bonds (19), the basic rings being interconnected by longitudinal side beams (18), and being bonded by the transverse bonds (19) with the upper central longitudinal beams, so as to form a support structure.

* * * * *

UNITED STATES PATENT AND TRADEMARK OFFICE
CERTIFICATE OF CORRECTION

PATENT NO. : 5,275,111
DATED      : January 4, 1994
INVENTOR(S) : Milorad Savicevic It is certified that error appears in the above-indentified patent and that said Letters Patent is hereby corrected as shown below:

On the title page, under item [19] and item [76], change "Savic evi" to --Savicevic--.

Signed and Sealed this

Twenty-ninth Day of March, 1994

Attest:

BRUCE LEHMAN

*Attesting Officer*  *Commissioner of Patents and Trademarks*